United States Patent [19]
Taskier et al.

[11] Patent Number: 4,973,532
[45] Date of Patent: Nov. 27, 1990

[54] BATTERY SEPARATOR WITH INTEGRAL THERMAL FUSE

[75] Inventors: Henry T. Taskier, Fanwood, N.J.; Steven M. Mullins; Ellen A. Langford, both of Charlotte, N.C.; Robert J. Fleming, Rock Hill, S.C.

[73] Assignee: Hoechst Celanese Corporation, Somerville, N.J.

[21] Appl. No.: 333,662

[22] Filed: Apr. 5, 1989

[51] Int. Cl.$^5$ .............................. H01M 6/50
[52] U.S. Cl. ...................... 429/62; 429/145
[58] Field of Search ................... 429/62, 145

[56] References Cited

U.S. PATENT DOCUMENTS

| | | | |
|---|---|---|---|
| 3,228,790 | 1/1966 | Sexsmith et al. | 117/138.8 |
| 3,380,851 | 4/1968 | Lindemann et al. | 117/140 |
| 3,558,764 | 1/1971 | Isaacson et al. | 264/210 |
| 3,679,538 | 7/1972 | Druin et al. | 161/159 |
| 3,843,761 | 10/1974 | Biernbaum et al. | 264/210 |
| 4,075,400 | 2/1978 | Fritts | 429/62 |
| 4,351,888 | 9/1982 | Dampier et al. | 429/62 |
| 4,407,910 | 10/1983 | Catanzarite | 429/62 |
| 4,559,938 | 12/1985 | Metcalfe | 128/156 |
| 4,650,730 | 3/1987 | Lundquist et al. | 429/62 |
| 4,731,304 | 3/1988 | Lundquist et al. | 429/62 |
| 4,734,324 | 3/1988 | Hill | 428/317.9 |
| 4,741,979 | 5/1988 | Faust et al. | 429/62 |

FOREIGN PATENT DOCUMENTS

| | | |
|---|---|---|
| 0246866 | 11/1987 | European Pat. Off. |
| 0352617 | 6/1989 | European Pat. Off. |
| 0336170 | 10/1989 | European Pat. Off. |
| 60-136161 | 3/1985 | Japan |
| 60-23954 | 8/1985 | Japan |
| 60-52 | 9/1985 | Japan |
| 61-232560 | of 1986 | Japan |
| 63-86355 | 3/1988 | Japan |
| 63-86358 | 11/1988 | Japan |
| 63-279562 | 11/1988 | Japan |
| WO87/07433 | 12/1987 | PCT Int'l Appl. |

OTHER PUBLICATIONS

*Machine Design*, "9-V Lithium Battery Safer," p. 48, Aug. 21, 1986.
Weiss, H. L., "Gravure Coaters," *Coating and Laminating Machines*, pp. 171-179 (1990).
Havens et al, "Thermal Protection for Lithium Batteries"; 4th Int'l Seminar on Lithium Battery Technology and Applications, Mar. 6-8, 1989.

*Primary Examiner*—Donald L. Walton
*Attorney, Agent, or Firm*—K. A. Genoni; J. M. Brown; B. H. Davidson

[57] ABSTRACT

A battery separator includes a porous substrate and a thermal fuse material adhered to at least one surface of said porous substrate. The thermal fuse material is adhered to the substrate surface in a predetermined geometric array thereupon so as to establish open areas of the at least one substrate surface to thereby allow ionic migration therethrough. The thermal fuse material forming the geometric array on the substrate surface may itself define open pores to further facilitate such ionic migration. The thermal fuse material melts at or near a predetermined threshold temperature so that the substrate's permeability irreversibly becomes significantly decreased and thus interrupts the chemical reaction in an electrochemical battery. In such a manner, batteries of improved safety may be provided using the separators of this invention.

44 Claims, 3 Drawing Sheets

BATTERY SEPARATOR WITH INTEGRAL THERMAL FUSE

FIELD OF INVENTION

This invention is generally related to the field of electrochemical batteries. More particularly, the invention relates to battery separators useful to minimize (if not eliminate) the risk of uncontrolled chemical reaction occurring within the batteries (as may be caused, for example, by short circuit conditions existing externally or internally of the battery). The invention, in preferred forms, may be embodied in a porous substrate (e.g., in the form of a sheet or film) on at least one surface of which there is adhered a thermal fuse material in a preselected geometric pattern which thereby defines an array of open areas on the porous substrate's surface (i.e., surface areas on which no thermal fuse material is adhered). The thermal fuse material preferably comprises at least one material having a predetermined melting temperature which is less than the melting temperature of the porous substrate, and exhibiting a desired melt flow index. In such a manner, the separators of the invention remain sufficiently permeable to migration of positive and negative ions during normal battery operations, yet irreversibly become significantly less permeable to such ionic migration during abnormal battery operations (e.g., during short circuit conditions), thereby substantially minimizing (if not stopping) uncontrolled chemical reactions within the battery.

BACKGROUND OF THE INVENTION

Electrochemical batteries have for some time been used as a means to power a variety of electronic consumer products. Conventional batteries are usually of the type having an anode, a cathode, a porous separator to maintain physical separation between the anode and cathode, and a suitable electrolyte supplying a source of positive and negative ions which migrate between the anode and cathode during use.

When used correctly (assuming no inherent defect in the battery), there is little risk that the battery will present a safety hazard to its user. However, when used incorrectly (as by a forced short-circuit condition caused by reversing the battery's polarity during use) and/or when a defect in the battery is present (as by a short-circuit condition due to the anode and cathode coming into physical contact with one another), there is a risk that uncontrolled chemical reaction of potentially explosive magnitude may occur within the battery. This risk is particularly acute for batteries employing a highly electropositive anode, for example, lithium, although the risk may still be present for more traditional electrochemical batteries, for example, nickel-cadmium cells. While a battery manufacturer can implement quality control procedures to minimize defectively manufactured batteries and prevent them from reaching consumers, there is little that can be done to ensure absolutely that batteries will be used correctly by their ultimate users.

Various proposals already exist to minimize uncontrolled thermal reactions in electrochemical battery cells as evidenced by U.S. Pat. No. 4,650,730 to Lundquist et al issued on Mar. 17, 1987; U.S. Pat. No. 4,731,304 to Lundquist et al issued on Mar. 15, 1988; U.S. Pat. No. 4,075,400 to Fritts issued on Feb. 21, 1978; U.S. Pat. No. 4,351,888 to Dampier et al issued on Sept. 28, 1982; U.S. Pat. No. 4,407,910 to Catanzarite issued on Oct. 4, 1983; and U.S. Pat. No. 4,741,979 issued to Faust et al on May 3, 1988.

The Lundquist et al U.S. Pat. Nos. 4,650,730 and 4,731,304, disclose sheet products said to be useful as battery separators, having at least two microporous plies which are coextensively bonded together into a unitary product. When the sheet is subjected to elevated temperatures, as where shorting occurs in an electrical storage battery, one of the plies is intended to melt and transform into a non-porous membrane. This pore closure is intended to shut down the electrical current flow in the battery.

According to Fritts '400, a woven mat assembly contains a plurality of thermoplastic globules which encapsulate a reaction-deactivating "poison". When the internal temperature of the battery reaches a predetermined maximum, the "poison" is released thereby deactivating the chemical reaction.

In Dampier et al '888, the current flow within a battery cell during abnormal operating conditions is limited due to dissolution of an additive material (for example, polyvinyl chloride) in the electrolytic solution. During normal operating conditions, however, this additive material is dispersed throughout the electrolytic solution without adversely affecting current flow within the cell.

The electrochemical cell according to Catanzarite '910 includes an inorganic solid anode-neutralizing agent which, at or near the melting point of the anode, enters into an endothermic, or at most mildly exothermic, reaction with the anode thereby neutralizing the same. At other temperatures, however, the anode-neutralizing agent is non-reactive with all cell components, including the anode.

A battery separator is disclosed in Faust et al '979 as including a porous film (e.g., a microporous film) bearing a porous layer of wax-coated fibers which serves as a thermal fuse. During normal operation, the wax-coated fiber layer does not close the pores of the film.

Notwithstanding these prior proposals in the art, there still exists a need to improve the safety of electrochemical batteries. It is towards satisfying such a need that the present invention is directed.

SUMMARY OF THE INVENTION

According to the present invention a battery separator is provided which includes a porous substrate with an integral thermal fuse. The thermal fuse is in the form of a meltable thermal fuse material adhered to at least one surface of the porous substrate in a predetermined geometric pattern. This meltable thermal fuse material thereby covers discrete surface regions of the porous substrate (which may or may not be connected to adjacent substrate surface regions covered by the thermal fuse material). Since the meltable thermal fuse material is in the form of a geometric pattern on the substrate's surface, open areas not covered by the thermal fuse material will be established between adjacent covered surface regions. In such a manner, these open areas allow the separators of this invention to remain sufficiently permeable to the migration of positive and negative ions between the anode and cathode during normal battery operations.

However, during abnormal conditions (e.g., short-circuit conditions), a preselected elevated internal temperature of the battery (determined in large part by the particular thermal fuse material that is employed) will cause the thermal fuse material to melt and flow over a sufficiently large portion (preferably the entirety) of the open areas, thereby significantly decreasing the separator's permeability to positive and negative ion migration. That is, the separator's resistance to ionic migration between the anode and the cathode in the battery cell significantly increases at or above a preselected internal elevated battery temperature so as to thereafter, in essence, minimize (if not stop entirely) the chemical reaction occurring within the battery.

These features, and others, of this invention will become more clear after careful consideration is given to the following detailed description of its preferred exemplary embodiments.

BRIEF DESCRIPTION OF THE ACCOMPANYING DRAWINGS

Reference will hereinafter be made to the accompanying drawings wherein.

DETAILED DESCRIPTION OF THE PREFERRED EXEMPLARY EMBODIMENTS

Figure 1:
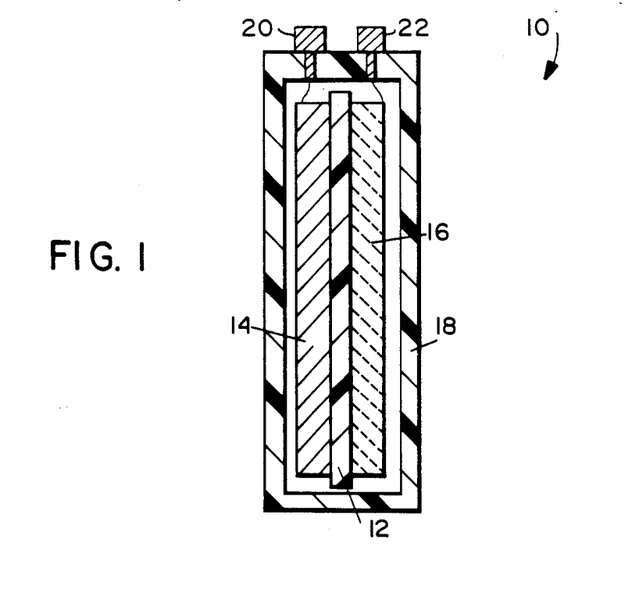
FIG. 1 is a cross-sectional schematic view of battery cell which includes a separator according to this invention.

A battery cell 10 which employs the novel separator 12 according to the present invention is shown in cross-sectional schematic view in accompanying FIG. 1. As is seen, the battery cell 10 includes an anode 14 and a cathode 16 with the separator 12 of this invention interposed therebetween. This assembly—that is, anode 14/separator 12/cathode 16—is housed within a container 18 with appropriate terminals 20, 22 electrically connected to the anode 14 and cathode 16, respectively. The anode and cathode may, for example, be lithium and manganese oxide, respectively, it being understood that the separator of the present invention may satisfactorily be utilized in batteries employing any other anode and cathode materials.

Figure 2:
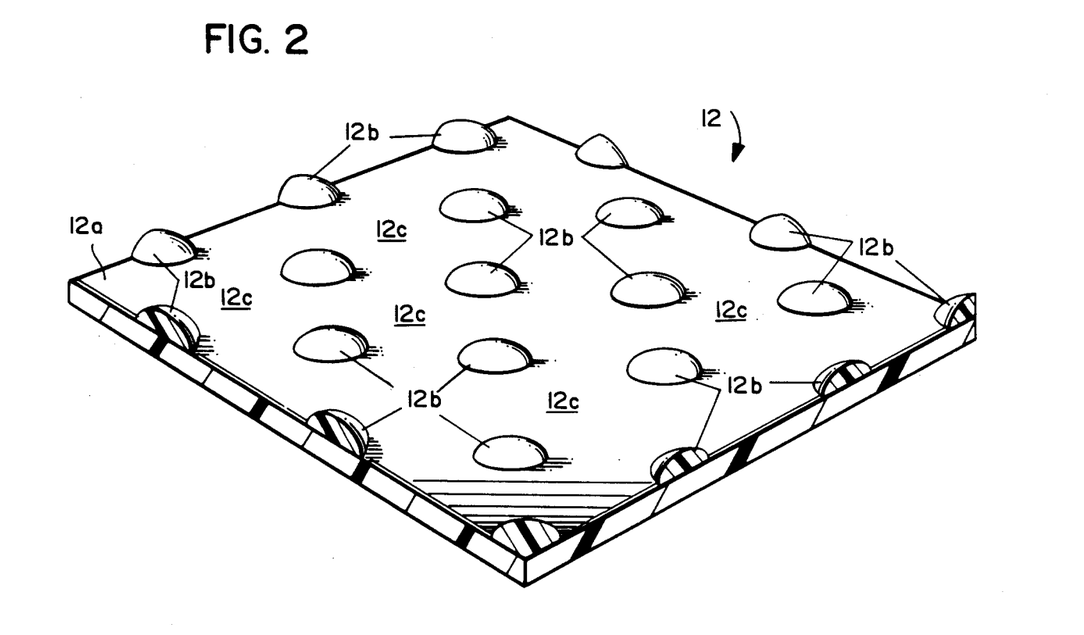
FIG. 2 is a cross-sectional schematic perspective view of a representative separator according to the present invention.
Figure 3:
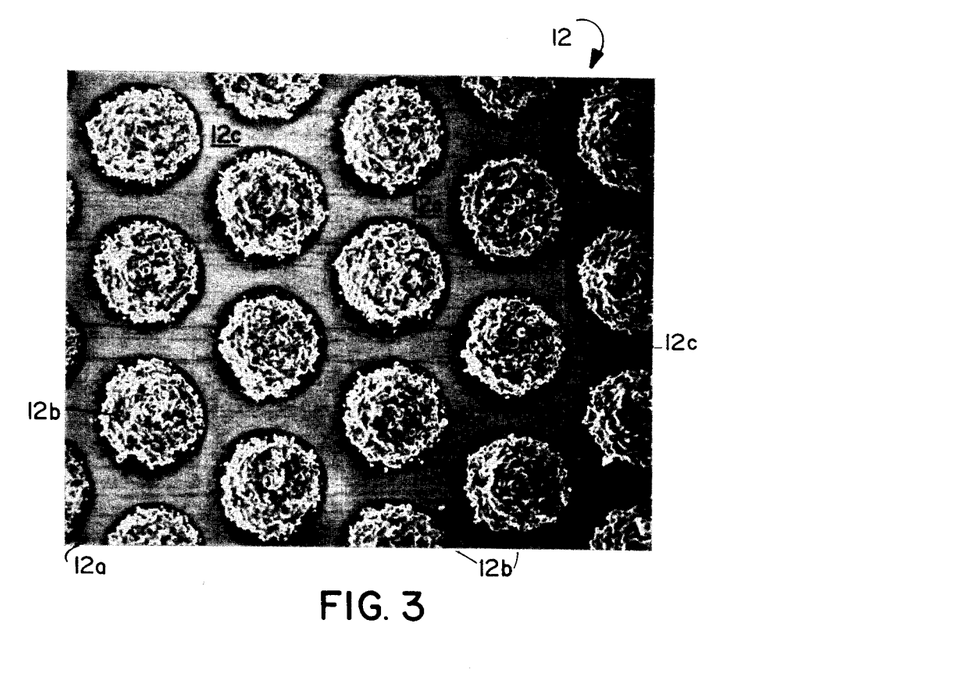
FIG. 3 is a photomicrograph, taken at a magnification of 25X, showing one possible battery separator according to the present invention.

One possible form of the separator 12 according to the present invention is shown schematically in accompanying FIG. 2, which is greatly enlarged for clarity of presentation. The separator 12 includes a porous substrate 12a having on at least one of its surfaces a geometric array of a number of regions (a representative few of which are identified in FIG. 2 by reference numeral 12b) comprised of the meltable thermal fuse material. Thus, open areas (a representative few of which are identified in FIG. 2 by reference numeral 12c) of the porous substrate 12a remain exposed (i.e., not covered by the thermal fuse material) between regions 12b. The permeability of the substrate 12 at the open areas 12c is therefore substantially unaffected by the presence of the thermal fuse material at regions 12b. That is, even though the thermal fuse material covers a portion of the substrate's surface, sufficient permeability through the substrate 12a still exists due to the presence of the open areas 12c. An actual sample of the separator 12 schematically depicted in FIG. 2, is shown in the photomicrograph of FIG. 3.

An exemplary geometric array of the thermal fuse material regions 12b is depicted in FIG. 2 as a number of "dots" aligned in staggered rows. It is to be understood, however, that any other geometric array may suitably be employed according to the present invention. Thus, "geometric array", "geometric pattern" and like terms are meant to refer to any orderly (i.e., nonrandom) pattern of preselected geometric configuration formed by the thermal fuse material on the surface of the underlying porous substrate which establishes open areas of the substrate surface on which no thermal fuse material is present. The thermal fuse material may therefore be present in discrete unconnected regions as shown by the staggered dot array in accompanying FIG. 2, but could likewise be present in a dot array whereby the individual dots are aligned both in rows and columns. Similarly, the thermal fuse material may take the form of a grid-like array in which intersecting lines or bands of the material establish the open areas, in which case these lines of thermal fuse material may be either perpendicular to one another, or biased with respect to one another and/or with respect to a dimension of the underlying substrate. Non-intersecting lines or bands of the thermal fuse material (either parallel or biased with respect to one another and/or with respect to a dimension of the underlying substrate), in addition to a combination of patterns (e.g., a "dot" pattern as shown in FIG. 2 and a grid-like array) adhered to the same, or different, substrate surfaces are also intended to be included within the definition of "geometric array", "geometric pattern" and like terms.

Likewise, the discrete regions 12b of thermal fuse material may be embodied in geometric forms other than the essentially circular "dots" shown in FIG. 2. Thus, for example, the regions 12b may be triangular, rectangular, and/or diamond-shape, if desired.

In general, it is preferred that the thermal fuse material cover no more than about 70% of the total substrate surface area on which it is adhered —that is, the separators according to the present invention should have at least about 30% or more open area (i.e., that percentage of the total substrate 12a surface not covered by the thermal fuse material). By way of example only, the specific geometric pattern shown in the photomicrograph of FIG. 3 (e.g., the dot matrix pattern) has a density of thermal fuse material regions 12b of about 648 per square inch, a frequency of 25 regions per linear inch, and about 52% open area (i.e., the percentage of the total substrate 12a surface represented by those areas referenced by numeral 12c in FIG. 3). As indicated above, however, virtually any geometric pattern may be successfully utilized in the practice of this invention.

Figure 4:
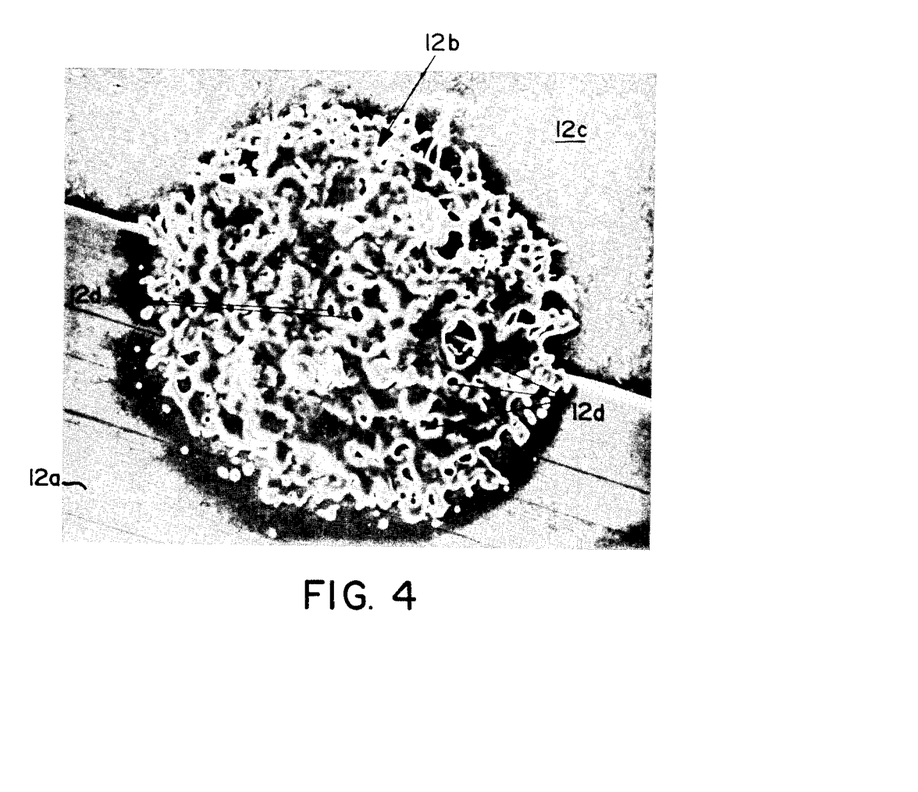
FIG. 4 is a photomicrograph, taken at a magnification of 100X, showing a representative region of meltable thermal fuse material on a porous substrate.
Figure 5:
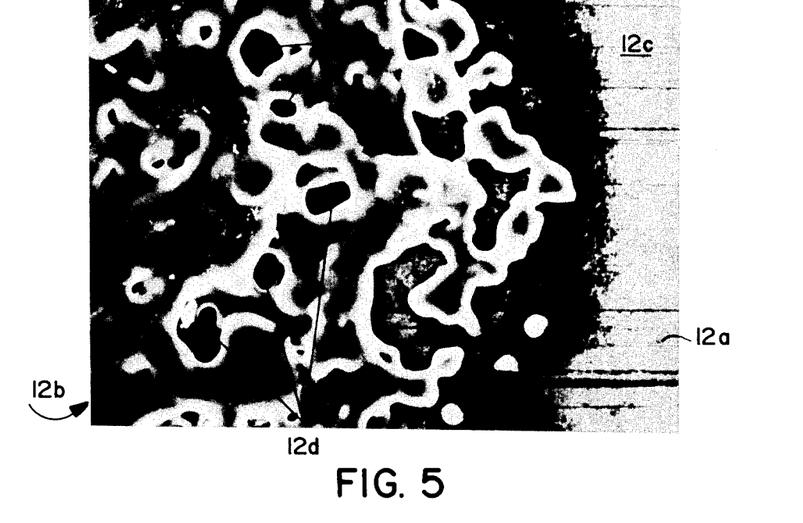
FIG. 5 is a photomicrograph, taken at a magnification of 300X, particularly showing a portion of the thermal fuse material region on a porous substrate.

As is seen particularly from the photomicrographs of FIGS. 4 and 5, the regions 12b of thermal fuse material may themselves be permeable due to the presence of open pores (a representative few of which are identified in FIGS. 4 and 5 by reference numeral 12d). These open pores 12d thereby permit at least some ionic migration to occur through the regions 12b during normal battery operation. Thus, in those embodiments of this invention where the thermal fuse material regions 12b are themselves permeable (i.e., due to the presence of pores 12d), a lesser impediment to the migration of ions during normal battery operation will ensue as compared to nonpermeable forms of regions 12b. Without wishing to be bound to any particular theory, it is surmised that when the regions 12b are applied in the form of a paste comprised of particulate thermal fuse material and a suitable carrier liquid (to be described in greater detail below), the pores 12d may be formed when the carrier liquid is removed and/or when the particulate thermal fuse material coalesces (e.g., upon drying at elevated temperatures near the melting point of the particulate thermal fuse material).

Any suitable porous substrate may advantageously be used in the separators of this invention provided it is (i) sufficiently permeable to migration of positive and negative ions, (ii) compatible with the other battery components, and (iii) provides a suitable surface to which a geometric array of thermal fuse material may be adhered. Thus, the substrate may be porous film or fabric (e.g., in woven or non-woven form).

Preferably, however, the substrate is an open-celled, microporous polymeric membrane of the type disclosed, for example, in U.S. Pat. No. 3,558,764 to Isaacson et al issued Jan. 26, 1971; U.S. Pat. No. 3,679,538 to Druin et al issued July 25, 1972; and/or U.S. Pat. No. 3,843,761 to Biernbaum et al issued on Oct. 22, 1974, the entire content of each of these prior-issued U.S. Patents being expressly incorporated hereinto by reference. Briefly, the preferred microporous film substrates useable in the battery separators of the present invention may be made from a non-porous precursor film, for example, according to the techniques of the U.S. Patents mentioned immediately above. The preferred microporous membranes will usually be formed from films of olefinic resins, e.g., polypropylene, or polyethylene, but membranes formed from films of other resins may also be employed depending, for example, upon the particular battery components with which the membranes will be used.

The pores of the preferred microporous film substrates are essentially interconnected through tortuous paths which may extend from one exterior surface or surface region to another, i.e., open-celled. These preferred microporous films will thus exhibit a reduced bulk density as compared with the density of their corresponding precursor film having no open-celled structure. Thus, the microporous films will preferably have a bulk density of no greater than about 95 percent, and usually between about 50 and 70 percent of the starting non-porous precursor film.

The preferred microporous films will usually exhibit a permeability of less than about 50 Gurley Units, and more typically less than about 35 Gurley Units. The term "Gurley Units" is the time, in seconds, required for ten cubic centimeters of air to pass through one square inch of membrane in a direction from one of the membrane's exterior surfaces to its other exterior surface under a pressure differential of 12.2 inches of water across the membrane. Since permeability is a measure of the ease of mass transfer across the membrane, lower Gurley Units correspond to lower mass transfer times, and hence correspond to higher permeabilities and a concomitant greater ease of mass transfer across the membrane.

The pores of the preferred microporous film substrates useable in the separators of the present invention are microscopic, i.e., the details of the pore configuration or arrangement are described only in terms of microscopic dimensions. Thus, the open cells or pores in the film are smaller than those which can be measured using an ordinary light microscope, because the wavelength of visible light, which is about 5,000 Angstroms, is longer than the longest planar or surface dimension of the open cell or pore. The pore size of the microporous films may be defined by using electron microscopy techniques which are capable of resolving details of pore structure below 5,000 Angstroms or by mercury porosimitry techniques.

The average effective pore size of the microporous films useable as substrates in the practice of this invention is preferably between 50 to 5000 Angstroms, and more typically between 150 to 5000 Angstroms. By "average effective pore size" is meant the smallest dimension of a pore which would allow a generally spherical particle of that same dimension to pass therethrough. The pores generally have an elongated shape with a width of from 50 to 5000 Angstroms, and a length of from 500 to 10,000 Angstroms. Hence, the "average effective pore size" of the preferred microporous films will usually be determined by the width dimension of the pores.

Microporous polymeric films of the type described above are commercially available from Hoechst Celanese Corporation, Separations Products Division, Charlotte, N. C. under the registered trademark CELGARD ®.

Any material may be used as the thermal fuse material according to the present invention provided that it melts at or near the "design" elevated internal threshold temperature of the battery in which the separator is to be employed, and exhibits the desired melt flow index so as to spread sufficiently over the normally open areas on the surface of the substrate (thereby providing significantly increased resistance (decreased permeability) to the migration of positive and negative ions through the separator). Thus, the term "thermal fuse material" is meant to refer to any material which melts at or near the predetermined internal elevated threshold temperature of the battery, yet below the melt temperature of the underlying substrate. To ensure that the substrate remains essentially intact during abnormally high internal temperatures, the thermal fuse material preferably has a melting point at least 10° C. less than the melting point of the underlying porous substrate to which it is adhered.

The selection of any particular thermal fuse material in combination with any particular underlying porous substrate is within the skill of those in this art. Suffice it to say here, however, that both the thermal fuse material and the porous substrate on which the material is adhered must be compatible with one another and with the other battery components and must otherwise respond in the desired manner during both normal and abnormal battery operating conditions. However, within these design criteria, a large number of possible thermal fuse material/substrate combinations exist, depending upon the particular electrochemical battery type with which the separator is intended to be used.

Preferably, the thermal fuse material will have a melting point of at least about 30° C., and usually between about 50° C. to about 200° C. These melting point temperatures will therefore be at or near the threshold internal elevated temperature of the battery in which thermal protection is desired. That is, for a desired battery threshold temperature (indicative of abnormal battery operating conditions), a thermal fuse material will be selected having a melting point at or near that same threshold temperature. Hence, the thermal fuse material predetermines the threshold temperature of the battery at or above which the electrochemical reaction within the battery is at least significantly minimized to an extent whereby the reaction practically (if not actually) ceases.

Another important criterion for any successful thermal fuse material is its ability to "spread" on the surface of the underlying porous substrate when melted so that it effectively covers the normally open areas of the substrate surface. In this regard, the thermal fuse material should exhibit a Melt Flow Index (as quantified, e.g., by ASTM D-1238, condition 190/2.16) of at least about 10 grams per ten minutes, and more preferably, at least about 200 grams per ten minutes or more.

Thus, virtually any thermal fuse material may be selected for use in the present invention provided it meets the criteria described above—that is, has a melting point below the melting point of the substrate on which it is adhered, and exhibits the desired flow characteristics when melted.

As non-limiting examples, the thermal fuse materials may be those waxes identified in previously mentioned U.S. Pat. No. 4,741,979 (the entire content of which is expressly incorporated hereinto by reference), in addition to a number of thermoplastic polymers, such as, for example, polyethylene (Allied Signal, Inc., Grades C-9, C-6 C-5, C-18, or A-617), low-density polyethylene (Plast Labor, SA, Coathylene TM HA1591, or HX1591), or ethylene-vinyl acetate copolymer (Allied-Signal, Inc., Grades 400, 405, or 430; Plast Labor, SA, Coathylene TM CB3547). Usually, the thermoplastic materials will be in the form of finely divided particles (e.g., average particle size of less than about 75 microns), but waxes of such thermoplastic materials may also be used, if desired.

It is presently preferred that the thermoplastic fuse material be applied to the substrate in the form of a paste which comprises a major amount of the thermal fuse material in particulate form in an inert carrier liquid (e.g., water), and optionally one or more processing and/or property-enhancing aids (e.g., surfactants, thickeners, adhesive agents and the like) in amounts to achieve desired effects for the paste (e.g., less than about 20 weight percent).

The carrier liquid which may be employed in the thermoplastic paste formulations may be virtually any liquid which is a nonsolvent for the particular thermoplastic material that is used. It is particularly preferred to employ water as the carrier liquid due to its availability, non-toxicity, and cost. Organic liquids may also be employed however, provided that they are nonsolvents for the thermoplastic material. For example, when polyethylene is employed as the thermoplastic material, organic alcohols, such as ethanol, and the like, may satisfactorily be used.

A number of well known, commercially available processing aids and property-enhancing aids may be employed in paste formulations having the thermal fuse material according to this invention. As non-limiting examples, the following preferred processing and/or property-enhancing aids may be employed.

SURFACTANTS

Preferred surfactants include those characterized by a symmetrically substituted two carbon backbone with a triple bond, two adjacent hydroxyl groups and four symmetrical methyl groups. Included within this definition is acetylenic diol, either alone or in admixture with other organic alcohols, such as, 2-ethylhexanol, ethylene glycol, propylene glycol, 2-butoxyethanol, and isopropyl alcohol. Surfactants of this type are commercially available from Air Products and Chemicals, Inc., under the trademark Surfynol ®.

Another class of surfactants are 1-hydroxyethyl-2-alkylimidazolines. Preferred are those having 7-17 carbon atom alkyl radicals attached to the carbon atom occupying the 2-position in the imidazoline. These surfactants are also commercially available from MONA Industries, Inc. under the tradename Monazolines TM.

Yet another class of surfactants include poly(alkaleneoxy) alcohols, with nonylphenoxy poly(ethylenepoxy)ethanol and dodecylphenoxypoly(ethyleneoxy) ethanol being parituculaly preferred. These preferred surfactants are commercially available from GAF Corporation, under the trademark IGEPAL ®, with IGEPAL ® CO-430 and IGEPAL ® RC-630 being particularly preferred.

Another class of surfactants includes nonioninc block copolymers of propylene oxide and ethylene oxide which are commercially available from BASF Corporation under the trademark Pluronic ®. Particularly preferred are block copolymers of propylene oxide and ethylene oxide identified as Pluronic ® L-101 and Pluronic ® L-62 surfactants.

THICKENERS

A variety of thickening agents may be employed so as to ensure that the paste formulations exhibit the desired flow characteristics during their application onto the porous substrate. For example, starch and cellulosic-based thickeners (e.g., methyl cellulose, carboxymethyl cellulose, and the like) may be used.

ADHESIVE AGENTS

Adhesive agents may be employed in the paste formulations to enhance the bonding of the particles of thermoplastic material one to another and to the porous substrate. Preferred adhesive agents include emulsions of vinyl acetate copolymers, with emulsions of vinyl acetate-ethylene copolymer and a partially acetylated polyvinyl alcohol being particularly preferred. These preferred adhesive agents are commercially available from Air Products and Chemicals, Inc. under the tradename Airflex ®. Of These, Airflex ® 400 has been found to be particularly useful as an adhesive agent.

After the thermoplastic paste formulation is deposited onto the substrate's surface in a preselected geometric array, the carrier liquid is then removed (e.g., by drying at elevated temperatures) so that the particulate thermal fuse material remains as a residue on the surface of the porous substrate, but is retained in the geometric array.

The elevated temperatures employed during drying and the residence time that the separators of this invention are exposed to such elevated temperatures are dependent upon the particular paste formulation of the thermal fuse material that is used. The temperature employed to remove the carrier liquid during the drying step should however be below the melting point temperature of the particular thermoplastic used as the thermal fuse material. Otherwise, the thermal fuse material would melt and spread on the substrate surface during production. Preferably, the elevated temperature at which the thermal fuse material paste is dried should be at least about 2° C. (preferably at least about 5° C.) below the melting point temperature of the thermoplastic fuse material.

The residence time during which the thermal fuse material is exposed to the elevated temperature should be sufficiently long so that the carrier liquid is removed from the paste—i.e., so that the thermoplastic material remains as a dried residue on the surface of the porous substrate.

While the particulate thermoplastic material should not melt and spread on the substrate surface during drying, it is sometimes preferred that the individual thermoplastic particles at least partially melt (i.e., coalesce) so as to fuse one to another and to the substrate's surface. When paste formulations of the thermal fuse material include an adhesive agent, it is usually unnecessary to coalesce the particulate thermoplastic (i.e., since the adhesive agent serves to bond the particles of thermoplastic material one to another and to the porous substrate's surface). In such situations, the temperatures and residence times may be less as compared to temperatures employed to dry paste formulations in which no adhesive agent is used. In general, therefore, the substrate and thermal fuse material are usually exposed during drying to elevated temperatures for between a few minutes to less than about one hour.

The thermal fuse material may alternatively be applied onto the surface of the porous substrate in the form of a hot melt. In such a case, the melt is allowed to solidify (e.g., by cooling) on the substrate's surface so as to maintain the established geometric array.

The thermal fuse material may be applied to one surface, or both surfaces, of the porous substrate in any convenient manner. If applied to one surface only, it is preferred that the surface on which no thermal fuse material is adhered face the cathode in the battery—i.e., so that the surface on which the thermal fuse material is adhered faces the anode.

The geometric array of thermal fuse material may, for example, conveniently be applied to the porous substrate via conventional printing techniques, such as screen printing and rotogravure printing techniques. Generally, the screen printing technique involves overlaying an apertured screen which establishes the desired geometric array. A paste or melt of the thermal fuse material (e.g., as above described) may then be forced through the screen apertures so as to be deposited onto the substrate surface in a geometric array corresponding to that of the screen apertures.

The rotogravure printing technique generally involves supplying an unmetered amount of the thermal fuse material in the form of a paste onto the exterior surface of a rotatable patterned gravure cylinder. A doctor blade scrapes excess paste from the gravure cylinder's surface. The porous substrate may then be brought into contact with the cylinder's surface so as to cause the paste thereon to be transferred onto the substrate's surface in same pattern as that on the gravure cylinder's surface.

In use, when the temperature within the battery is at or near the threshold temperature, the thermal fuse material will melt and flow onto the normally open areas of the substrate surface. This melting and flow of thermal fuse material will therefore essentially block the permeability of the normally open areas thereby increasing the overall resistance (decrease the overall permeability) of the separator which, in turn, effectively terminates the electrochemical reaction occurring within the battery.

Although a wide variety of decreased permeabilities are possible (i.e., due to the particular thermal fuse material and/or porous substrate that are selected for any given type of battery system), the separators of this invention should provide an increase in terms of Gurley Units during a "shutdown" condition (i.e., during a condition whereby the integral thermal fuse is activated) which is at least about 100% greater than the Gurley Units of the separators during normal operating conditions. As a specific example, for a threshold temperature of about 120° C., the separators should exhibit about a 500% increase in Gurley Units.

The following Examples, which are intended to be illustrative only and nonlimiting, will provide a further understanding of this invention.

EXAMPLES

In the following Examples, battery separator samples were subjected to the following qualitative testing. Unless otherwise indicated, all components of the thermoplastic paste formulations in the following Examples are expressed in terms of the components' percent by weight based on the total weight of the formulation.

A. Battery Failure Simulation Testing

The separator samples were subjected to elevated temperature conditions simulating the abnormal internal temperature conditions which would exist within a battery cell, and which would necessitate activation of the integral thermal fuse according to this invention. In this regard, 3 inch by 6 inch samples of the separators were placed between the plates of a commercial hot plate (Black & Decker Grill Wafflebaker, Cat. #Z1G48TD) controlled so that the samples were exposed to increasing temperature from ambient to a set temperature of 70° C. or 150° C. at a rate of 5.4° C. per minute.

The side of the separator on which the thermal fuse material was adhered was placed on top of a Teflon ® coated fabric (in which a thermocouple had been threaded substantially at its midline) so that the thermal fuse material was face up against the lid of the hot plate. The bottommost plate of the hot plate was covered with a similar Teflon ® coated fabric over which a 0.25 inch thick aluminum plate was placed. A layer of poster board having a 0.5 inch slit at approximately its midline was placed between the aluminum plate and the Teflon ® coated fabric bearing the separator samples to be tested. The slit in the poster board was provided so that the thermocouple more accurately measured the temperature of the hot plate, and hence provided more accurate control over the temperature to which the separator samples were exposed.

B. Permeability Testing

Permeability measurements for each separator sample were obtained before and after the battery failure simulation test described above using a High Pressure Gurley Densometer (No. 4120, available from W. & L. F. Gurley Co., Troy, N. Y.) and operated according to ASTM D-726-58, Method B. The permeabilities of the samples before and after being subjected to the battery failure simulation test are identified below as the "Initial Gurley Units" and the "Shutdown Gurley Units", respectively. These permeability measurements therefore provide a basis for determining a percent decrease in permeability (i.e., percent increase in terms of Gurley Units) of the separator samples when exposed to elevated temperatures, and hence provide a means of determining the effectiveness of the thermal fuse materials in the separators of this invention.

C. Adhesion Testing

Adhesion values were determined by applying masking tape to the separator on the side to which the thermal fuse material had been applied and then visually determining the amount of thermal fuse material adhered to the tape when it was removed. Values between 4 (designating no thermal fuse material stuck to the tape) and 0 (designating total removal of the thermal fuse material by the tape) were ascribed to the samples according to this test.

EXAMPLE I

A paste comprised of 56% particulate low density polyethylene (Plast-Labor, S.A. Coathylenem TM HA1591), 1% surfactant (Monoazoline TM O, MONA Industries, Inc.), and the balance water was prepared. The paste was applied to a surface of a microporous polypropylene film (Celgard ® 2500, Hoechst Celanese Corporation) by screen printing using an 83 mesh screen. The thermal fuse material was then dried by placing the screen-printed substrate (taped to a stainless steel plate) in a laboratory oven (Fisher Model 116G) at a temperature of 90°–95° C. for about 50 minutes. The separator had an overall thickness of 7.0 mils after drying. The separator exhibited an adhesion value of 3, and a permeability of 13.1 Initial Gurley Units. The separator was then subjected to the battery failure simulation test and exhibited a permeability of greater than 8400 Shutdown Gurley Units at 125° C. thereby indicating satisfactory thermal fuse properties.

EXAMPLE II

Example I was repeated except that the low density polyethylene was present in an amount of 62% and 0.4% surfactant (Igepal ® RC630, GAF Corporation) was employed in the thermal fuse material paste. The paste was then screen-printed onto a surface of a microporous polypropylene substrate (Celgard ® 2500) using a 60 mesh screen and was dried in the manner described in Example I. The separator had an overall thickness of 8.0 mils after drying. The separator exhibited an adhesion value of 3, and a permeability of 10.4 Initial Gurley Units. The separator was then subjected to the battery failure simulation test and exhibited a permeability of greater than 12,000 Shutdown Gurley Units at 125° C. thereby indicating satisfactory thermal shutdown properties.

EXAMPLE III

A paste comprised of 39% wax (Eastman Kodak Company, Epolene TM wax C-13), 1.7% surfactant (Monoazoline TM O, MONA Industries, Inc.), and the balance water was prepared. The paste was applied to a surface of a microporous polypropylene film (Celgard ® 2500) by screen printing using an 60 mesh screen and was dried in the manner described in Example I. The separator had an overall thickness of 18.0 mils after drying. The separator exhibited an adhesion value of 4, and a permeability of 18.0 Initial Gurley Units. The separator was then subjected to the battery failure simulation test and exhibited a permeability of 3,392 Shutdown Gurley Units at 125° C. thereby indicating satisfactory thermal fuse properties.

EXAMPLE IV

Example III was repeated except that the paste was screen printed onto the surface of the substrate using an 83 mesh screen. The separator had an overall thickness of 5.0 mils after drying and exhibited an adhesion value of 3, and a permeability of 12.3 Initial Gurley Units. The separator was then subjected to the battery failure simulation test and exhibited a permeability of 354 Shutdown Gurley Units at 125° C. thereby indicating satisfactory thermal fuse properties.

EXAMPLE V

A thermal fuse material paste was prepared mixing 45% particulate polyethylene wax (Shamrock S-394, Shamrock Technologies, Inc.), 9.5% of an adhesive agent (Airflex ® 400, Air Products and Chemicals, Inc.), 0.6% total surfactant (i.e., 0.2% Igepal ® RC630, 0.2% Igepal ® CO430, GAF Corporation, and 0.2% Surfynol ®, Air Products and Chemicals, Inc.), and the balance water. A piece of rubber 6 inches × 12 inches × ¼ inch was secured to a laboratory bench top, and a similarly sized piece of microporous polypropylene film (Celgard ®2500) was secured over the rubber. The paste was applied to the surface of the film by feeding a manual gravure applicator roll with small quantities of the paste while moving the roll across the film's surface. The applicator roll contained 18 quadrangular cells per linear inch, each cell being approximately 1 mm × 1 mm, and spaced apart by 0.1 mm.

The gravure-printed film was then dried in a laboratory oven (Fisher Model 116G) at 80° C. for 15 minutes. The resulting battery separator had a thickness of 6.5 mils after drying, and exhibited an adhesion value of 3 and a permeability of 8.1 Initial Gurley Units. The separator was then subjected to the battery failure simulation test and exhibited permeabilities of 24 Gurley Units at 110° C., 1,000 Gurley Units at 115° C., and greater than 30,000 Gurley Units at 125° C. thereby corresponding to an increase over the Initial Gurley Units of 196%, 12,246% and 370,000%, respectively.

EXAMPLE VI

A paste comprised of 56% particulate low density polyethylene (Plast-Labor, S.A., Coathylene TM HA1591), 0.4% surfactant (Pluronic ® L-101), and the balance water was prepared. The paste was applied to a surface of a microporous polypropylene film (Celgard ® 2500) by screen printing using a 60 mesh screen. The sample was then dried in a laboratory oven for 50 minutes at 90°–95° C. The resulting separator had an overall thickness of 6.3 mils after drying. The separator exhibited an adhesion value of 3, and a permeability of 9.7 Initial Gurley Units. The separator was then subjected to the battery failure simulation test and exhibited a permeability of greater than 12,000 Gurley Units after heating to 125° C. thereby indicating satisfactory thermal fuse properties.

EXAMPLE VII

Example VI was repeated using a paste formulation comprised of 48% particulate low density polyethylene (Plast-Labor, S.A., Coathylene TM HA1591), 0.4% surfactant (Pluronic ® L-62), and the balance water. The separator exhibited an adhesion value of 3, and a permeability of 9.0 Initial Gurley Units. After being subjected to the battery failure simulation test to a temperature of 125° C., the permeability of the separator was greater than 12,000 Gurley Units thereby indicating satisfactory thermal fuse properties.

EXAMPLE VIII

A paste comprised of 45% particulate low density polyethylene (Plast-Labor, S.A., Coathylene ™ HA1591), 0.4% surfactant (Pluronic ® L-101), and the balance water was prepared. The paste was applied to a surface of a microporous polyethylene film (Celgard ® K-864) by screen printing using a 60 mesh screen. The sample was then dried in a laboratory oven for 50 minutes at 90°–95° C. The resulting separator had an overall thickness of 7.2 mils after drying. The separator exhibited an adhesion value of 3, and a permeability of 5.0 Initial Gurley Units. The separator was then subjected to the battery failure simulation test and exhibited a permeability of greater than 23.2 Gurley Units after heating to 100° C., and 488.8 Gurley Units after heating to 110° C., thereby indicating satisfactory thermal fuse properties.

The above data demonstrate the effectiveness of the separators of the present invention to significantly increase in permeability in response to elevated temperatures, while exhibiting satisfactory permeabilities under normal temperatures. Thus, the separators of this invention are well suited for use in batteries as a means to provide a thermal fuse since such decreased permeabilities at elevated temperatures would significantly reduce the ionic migration between the anode and cathode in the battery, thereby providing a "shutdown" capability to the battery in the event of battery malfunction and/or improper battery use.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A battery separator comprising a porous substrate and a thermal fuse material adhered to at least one surface of said porous substrate in a predetermined geometric array thereupon so as to establish open areas of said at least one surface.

2. A battery separator as in claim 1, wherein said geometric array of thermal fuse material is porous.

3. A battery separator as in claim 1, wherein said predetermined geometric array is a plurality of discrete regions each consisting essentially of said thermal fuse material and aligned in a number of rows.

4. A battery separator as in claim 3, wherein said regions of one of said rows are staggered with respect to said regions of adjacent ones of said rows.

5. A battery separator as in claim 1, wherein said open areas established by said predetermined geometric array of thermal fuse material are at least about 30 percent of said substrate surface.

6. A battery separator as in claim 1, wherein said porous substrate is a film or a fabric.

7. A battery separator as in claim 1, wherein said porous substrate is an open-celled, microporous polymeric film.

8. A battery separator as in claim 7, wherein said film is a polyolefin.

9. A battery separator as in claim 8, wherein said polyolefin is polyethylene or polypropylene.

10. A battery separator as in claim 1, wherein said thermal fuse material is selected from the group consisting of waxes and thermoplastics.

11. A battery separator as in claim 10, wherein said thermoplastics are particulate.

12. A battery separator comprising a porous substrate, and thermal fuse means integrally associated with said porous substrate for significantly decreasing permeability of said porous substrate in response to exposure to a predetermined threshold temperature below a melting temperature of said substrate, wherein said thermal fuse means includes a material meltable substantially at said threshold temperature and adhered to at least one surface of said substrate in the form of a geometric pattern which establishes regions on said at least one surface covered by said meltable material, and open areas on said substrate surface uncovered by said meltable material.

13. A battery separator as in claim 12, wherein said meltable material in the form of said geometric array is porous.

14. A battery separator as in claim 12 or 13, wherein said predetermined geometric array is a plurality of discrete regions each consisting essentially of said thermal fuse material and aligned in a number of rows.

15. A battery separator as in claim 14, wherein said regions of one of said rows are staggered with respect to said regions of adjacent ones of said rows.

16. A battery separator as in claim 12, wherein said open areas are at least about 30 percent of said at least one substrate surface.

17. A battery separator as in claim 12, wherein said porous substrate is a film or a fabric.

18. A battery separator as in claim 12, wherein said porous substrate is an open-celled, microporous polymeric film.

19. A battery separator as in claim 18, wherein said film is a polyolefin.

20. A battery separator as in claim 19, wherein said polyolefin is polyethylene or polypropylene.

21. A battery separator as in claim 12, wherein said thermal fuse material is selected from the group consisting of waxes and thermoplastics.

22. A battery separator as in claim 21, wherein said thermoplastics are particulate.

23. In a battery comprising an anode, a cathode, and a separator interposed between said anode and cathode, the improvement wherein said separator includes a porous substrate and a thermal fuse material adhered to at least one surface of said porous substrate in a predetermined geometric array thereupon so as to establish open areas of said at least one substrate surface.

24. In a battery as in claim 23, wherein said open areas established by said predetermined geometric array of thermal fuse material are at least about 30 percent of said substrate surface.

25. In a battery as in claim 23, wherein said thermal fuse material adhered to said substrate in said predetermined geometric array is porous.

26. In a battery as in claim 23 or 25, wherein said predetermined geometric array is a plurality of discrete regions each consisting essentially of said thermal fuse material and aligned in a number of rows.

27. In a battery as in claim 26, wherein said regions of one of said rows are staggered with respect to said regions of adjacent ones of said rows.

28. In a battery as in claim 23, wherein said thermal fuse material is selected from the group consisting of waxes and particulate thermoplastics.

29. In a battery as in claim 23, wherein said porous substrate is a film or a fabric.

30. In a battery as in claim 23, wherein said porous substrate is an open-celled, microporous polymeric film.

31. In a battery as in claim 30, wherein said film is a polyolefin.

32. In a battery as in claim 31, wherein said polyolefin is polyethylene or polypropylene.

33. A method of fabricating a battery separator comprising applying a meltable thermal fuse material in a predetermined geometric pattern onto at least one surface of a porous substrate.

34. A method as in claim 33, wherein said meltable thermal fuse material is applied in the form of a plurality of discrete regions each consisting essentially of said thermal fuse material and aligned in a number of roWs.

35. A method as in claim 34, wherein said thermal fuse material is applied so that the regions of one of said rows are staggered with respect to the regions of adjacent ones of said rows.

36. A method as in claim 33, wherein said thermal fuse material is applied by supplying liquid thermal fuse material to a surface of a pattern roll, and then bringing said substrate into contact with said pattern roll so that said liquid thermal fuse material is transferred onto the substrate surface in the form of said geometric pattern.

37. A method as in claim 33, wherein said thermal fuse material is applied by overlaying said at least one surface with an apertured member which defines said predetermined geometric pattern, and then forcing liquid thermal fuse material through the apertures of said member so that the thermal fuse material is deposited onto said at least one surface in said predetermined geometric pattern.

38. A method as in claim 36 or 37, wherein said thermal fuse material is applied in the form of a liquid paste consisting essentially of particulate thermoplastic material in an inert carrier liquid.

39. A method as in claim 38, which further comprises removing the carrier liquid so that the particulate thermoplastic remains as a residue on said at least one surface.

40. A method as in claim 39, which further comprises drying the applied paste by subjecting the substrate with the applied paste thereon to elevated temperature sufficient to remove the carrier liquid so that the thermoplastic material remains as a residue on the substrate surface.

41. A method as in claim 40, wherein said step of drying the applied paste includes subjecting the separator to elevated temperature at least about 2° C. below the melting point of the thermoplastic material for less than about one hour.

42. A method as in claim 40, wherein said step of drying the applied paste is practiced at a temperature which partially melts said particulate thermoplastic material.

43. A method as in claim 41, wherein the thermal fuse material is applied as an aqueous mixture which further consists essentially of at least one additive selected from surfactants, thickeners, and adhesive agents.

44. A method as in claim 36 or 37, wherein said thermal fuse material is applied in the form of a melt, the method further comprising allowing the melt to solidify on said at least one substrate surface.

* * * * *